United States Patent [19]

Hattori et al.

[11] Patent Number: 4,643,048

[45] Date of Patent: Feb. 17, 1987

[54] METHOD OF CONTROLLING AUTOMATIC TRANSMISSION IN ACCORDANCE WITH DETERMINATION OF OPTIMUM GEAR RATIO

[75] Inventors: Toshihiro Hattori, Ayase; Makoto Uriuhara, Yokohama; Hitoshi Kasai; Yasuyoshi Asagi, both of Kanagawa; Noriaki Ogawa, Tokyo, all of Japan

[73] Assignees: Isuzu Motors Limited, Tokyo; Fujitsu Limited, Kawasaki, both of Japan

[21] Appl. No.: 625,695

[22] Filed: Jun. 28, 1984

[30] Foreign Application Priority Data

Jun. 30, 1983 [JP] Japan .................. 58-118450

[51] Int. Cl.⁴ ............... B60K 41/18; B60K 41/10
[52] U.S. Cl. ........................ 74/866; 74/877;
364/424.1; 192/0.044; 192/0.09
[58] Field of Search .............. 74/866, 877, 336 R;
192/0.044, 0.052, 0.055, 0.073, 0.09, 0.092;
364/424.1

[56] References Cited

U.S. PATENT DOCUMENTS

| | | | |
|---|---|---|---|
| 3,662,625 | 5/1972 | Wakamatsu et al. | 74/866 |
| 3,682,014 | 8/1972 | Magg et al. | 74/336 R |
| 3,744,347 | 7/1973 | Kubo et al. | 74/336 R |
| 3,805,640 | 4/1974 | Schneider et al. | 74/645 |
| 3,854,559 | 12/1974 | Talak et al. | 192/4 A |
| 4,140,031 | 2/1979 | Sibend et al. | 74/336 R |

FOREIGN PATENT DOCUMENTS

| | | | |
|---|---|---|---|
| 0136624 | 10/1980 | Japan | 74/866 |
| 0148624 | 11/1980 | Japan | 74/866 |
| 0058519 | 4/1982 | Japan | 74/866 |

OTHER PUBLICATIONS

European Search Report, completed Sep. 17, 1984, by Examiner Schatek at Vienna.

Primary Examiner—Leslie A. Braun
Assistant Examiner—Dirk Wright
Attorney, Agent, or Firm—Staas & Halsey

[57] ABSTRACT

A method of controlling the gear changing operation of an automatic transmission includes determining an optimum gear position based on a car speed and an extent of depression of an accelerator pedal to control a gear transmission to select the optimum gear position, and selecting neutral when the determined optimum gear position is lower than a selected gear position at the time the accelerator pedal is released, to interrupt the gear changing operation until the accelerator pedal is depressed.

10 Claims, 6 Drawing Figures

METHOD OF CONTROLLING AUTOMATIC TRANSMISSION IN ACCORDANCE WITH DETERMINATION OF OPTIMUM GEAR RATIO

BACKGROUND OF THE INVENTION

The present invention relates to a method of controlling the gear changing operation in an automatic transmission in accordance with a determination of an optimum gear position based on a vehicle speed and a depth to which an accelerator pedal has been depressed, and more particularly to a method of controlling gear the changing operation during deceleration of the vehicle while the accelerator pedal is released.

There has been proposed, in the recent past, an automatic transmission for effecting the gear changing operation of a gear transmission having gears on parallel shafts with a gear changing actuator controlled by an electronic control device. The proposed automatic transmission has a synchromesh system for forward gear positions. The synchromesh system produces a gear shift sound or click when two rotating bodies or cones turning at different speeds are brought into synchronism in a short period of time so that any relative cone speed difference will be eliminated. The automatic transmission also generates sounds during a gear changing operation when shift forks in the gear change actuator and the transmission hit stoppers. These mechanically induced sounds do not normally attract driver's attention during driving operation, particularly when the driver is travelling normally. However, while the car is being decelerated with the accelerator pedal released, for example, from the speed of 70 km/h to a stop, the transmission gears are shifted down successively from the 5th to 4th to 3rd to 2nd to 1st gear position. When the car is braked until it is stopped, even though the clutch is not connected the gear changing actuator operates to shift the gears from the 4th to 3rd to 2nd gear position. Therefore, the gear change actuator is unnecessarily operated to produce successive noisy shift sounds which makes the driver uncomfortable.

SUMMARY OF THE INVENTION

It is an object of the present invention to provide a method of controlling the gear changing operation in an automatic transmission to prevent the unnecessary operation of a gear changing actuator assembly while a car is being decelerated with the accelerator pedal released.

Another object of the present invention is to provide a method of controlling the gear changing operation in an automatic transmission to prevent the generation of gear shift sounds which would otherwise be produced due to the unnecessary operation of a gear changing actuator while a car is being decelerated.

Still another object of the present invention is to provide a method of controlling the gear changing operation in an automatic transmission to shift gears to the 1st gear position to thereby produce a necessary driving force and effect an engine brake when an optimum gear position is the 1st gear position at the time the accelerator pedal is released.

According to the present invention, a method of controlling the gear changing operation in an automatic transmission having a gear transmission, a gear changing actuator assembly for changing gears in the gear transmission, a car speed sensor for detecting a car speed, an accelerator pedal sensor for detecting the extent of depression of an accelerator pedal, and an electronic control system responsive to detected signals from the car speed sensor and the accelerator pedal sensor for determining an optimum gear position and controlling the gear changing actuator assembly to operate the gear transmission to select the optimum gear position, comprises the steps of detecting an extent of depression of the accelerator pedal and a car speed from the accelerator pedal sensor and the car sensor, respectively, determining an optimum gear position based on the extent of depression of the accelerator pedal, and controlling the gear changing actuator assembly to operate the gear transmission to select a neutral position to interrupt the gear changing operation until the accelerator pedal is depressed when the determined optimum gear position is lower than a currently selected gear position at the time the extent of depression of the accelerator pedal is zero. Further according to the present invention, the gear changing actuator assembly is controlled to operate the gear transmission to select a neutral position to interrupt the gear changing operation except when the determined gear position is a 1st gear position until the accelerator pedal is depressed, when the determined optimum gear position is lower than a currently selected gear position at the time the extent of depression of the accelerator pedal is zero, and is also controlled to operate the gear transmission to select the optimum gear position when the determined gear position is the 1st gear position.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
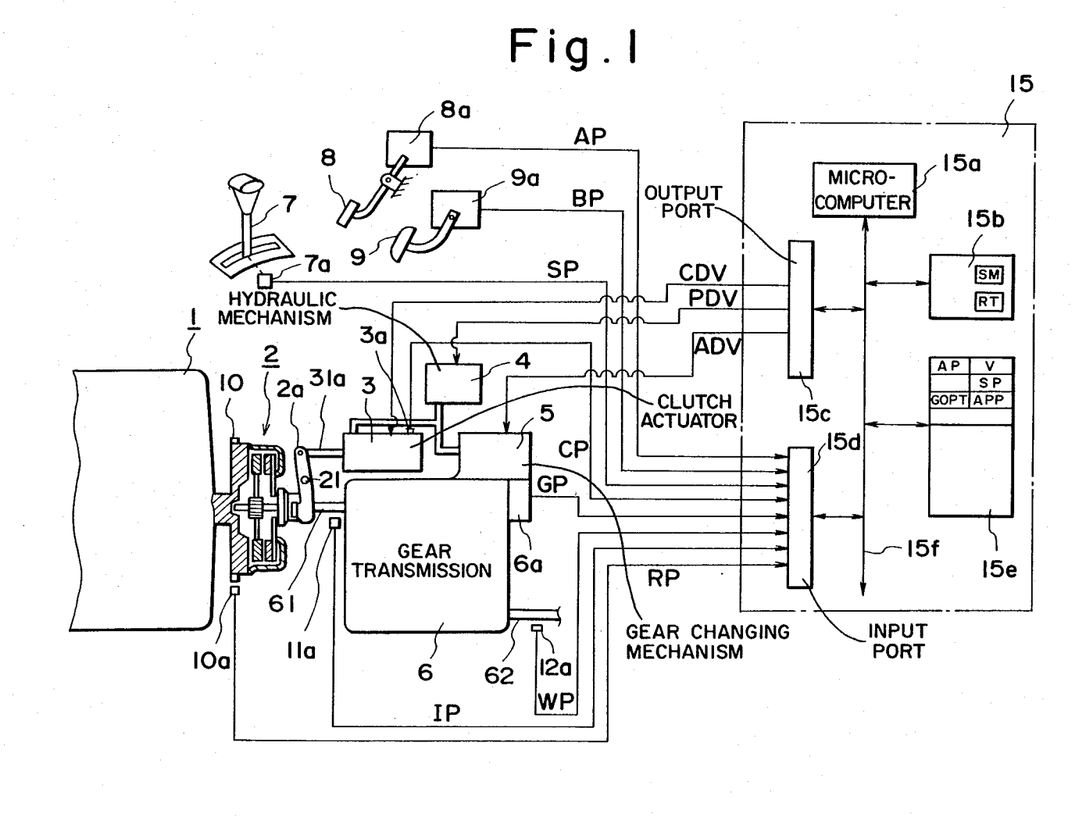
FIG. 1 is a block diagram showing an automatic transmission control system by which a method of the present invention is carried out and showing an automatic transmission partly in cross section.

FIG. 1 shows an engine 1 including a fuel supply control device (not shown) such as a throttle valve for controlling the amount of an air-fuel mixture introduced into engine cylinders or a fuel injection pump, the engine 1 being connected to a flywheel 10. A clutch 2 mounted on the flywheel 10 comprises a known friction clutch having a clutch release lever 2a. The extent to which the clutch 2 is engaged or connected is controlled by a clutch actuator 3 having a piston rod 31a connected to the clutch release lever 2a. The clutch actuator 3 is operated by a hydraulic mechanism 4. The clutch actuator 3 has a clutch stroke sensor 3a for detecting an operated position of the clutch actuator 3 or the extent of engagement of the clutch 2.

A gear transmission 6 having parallel gear shafts includes a synchromesh system for gear positions other than a reverse gear position. The gear transmission 6 has an input shaft 61 coupled to the clutch 2 and includes a gear position sensor 6a for detecting a selected gear position of the gear transmission 6. The gear changing operation of the gear transmission 6 is controlled by a gear changing actuator assembly 5 composed of a select actuator and a shift actuator, as described below, which are also operated by the hydraulic mechanism 4. The gear transmission 6 also has an output shaft 62 coupled to a drive shaft (not shown).

A select lever 7, whicn is manipulated by the driver, is selectively shiftable into an "N" range (neutral position), a "drive" range (automatic gear changing position), a "1" range (1st gear position), a "2" range (2nd gear position), a "3" range (automatic gear changing position for 1st, 2nd and 3rd gears), and an "R" range (reverse gear position). The select lever 7 is associated with a select position sensor 7a for detecting a selected range position.

An accelerator pedal 8 is operatively connected to an accelerator pedal sensor 8a comprising a potentiometer for detecting the depth or extent to which the accelerator pedal 8 is depressed.

A brake pedal 9 is operatively connected to a brake pedal sensor 9a comprising a potentiometer for detecting the depth or extent to which the brake pedal 9 is depressed.

An engine rotation sensor 10a is disposed in confronting relation to the outer periphery of the wheel 10 for detecting the number of r.p.m. of the engine 1. An input shaft rotation sensor 11a is disposed in confronting relation to the outer periphery of the input shaft 61 for detecting the number of r.p.m. of the input shaft 61. A car speed sensor 12a is disposed in confronting relation to the outer periphery of the output shaft 62 for detecting the number of r.p.m. of the output shaft 62.

An electronic control system 15 for controlling the automatic transmission comprises a microcomputer composed of a processor 15a for effecting arithmetic operations, a read-only memory (ROM) 15b storing a control program for controlling the gear transmission 6 and the clutch actuator 3, an output port 15c, an input port 15d, a random-access memory (RAM) 15e for storing the results of the arithmetic operations, and an address and data bus (BUS) 15f interconnecting the processor 15a, the ROM 15b, the output and input ports 15c, 15d, the RAM 15e, and the BUS 15f. The output port 15c is connected to the clutch actuator 3, the hydraulic mechanism 4, and the gear changing actuator assembly 5 and issues drive signals CDV, PDV, ADV for driving the clutch actuator 3, the hydraulic mechanism 4, and the gear changing actuator assembly 5, respectively. The input port 15d is connected to the clutch stroke sensor 3a, the gear position sensor 6a, the select position sensor 7a, the accelerator pedal sensor 8a, the brake pedal sensor 9a, the engine rotation sensor 10a, the input shaft rotation sensor 11a, and the car speed sensor 12a, and receives detected siganls CP, GP, SP, AP, BP, RP, IP, WP respectively from these sensors.

Figure 2:
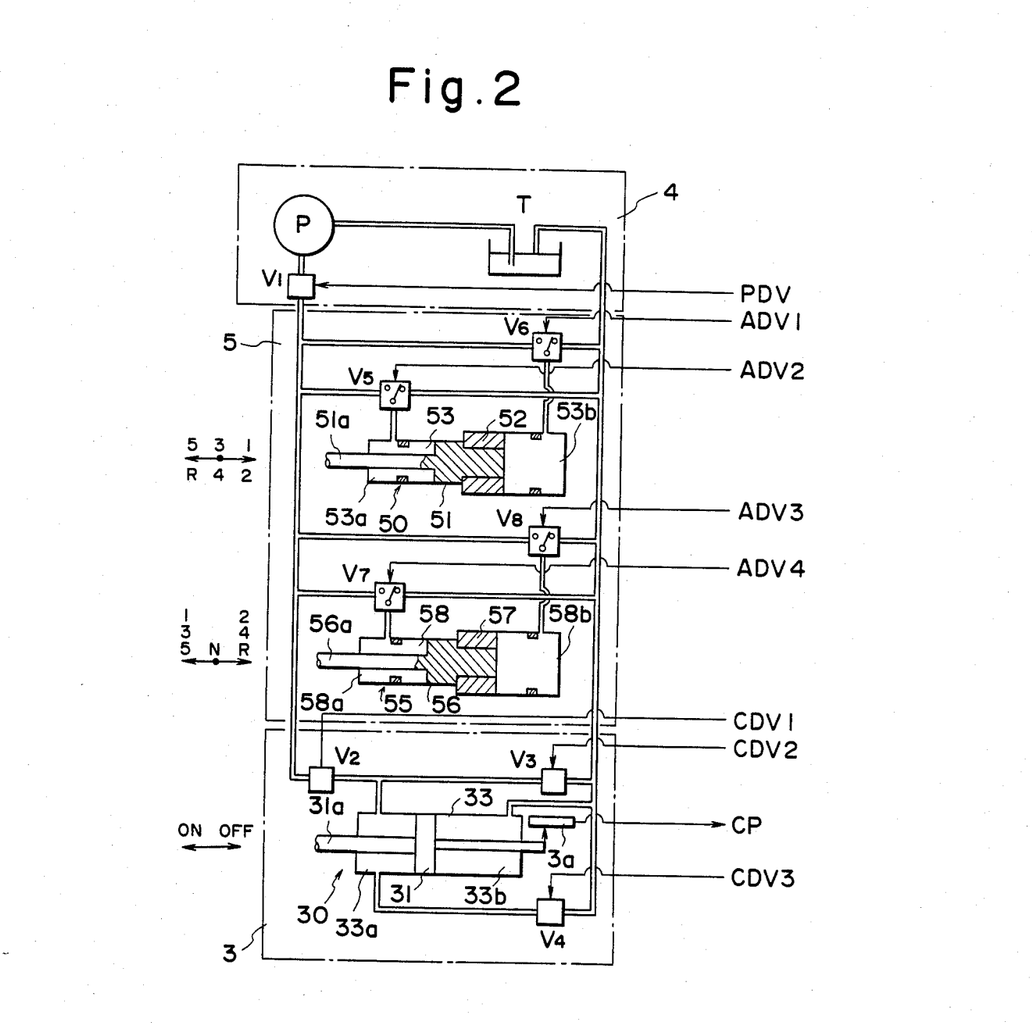
FIG. 2 is a schematic view, partly in cross section, showing of a clutch actuator, a gear changing actuator, and a hydraulic mechanism in the automatic transmission shown in FIG. 1.

FIG. 2 shows in greater detal the cluch actuator 3, the speed changing actuator assembly 5, and the hydraulic mechanism 4.

The hydraulic mechanism 4 is composed of a tank T, a hydraulic pump P, and an on-off valve $V_1$.

The clutch actuator 3 comprises a cylinder assembly 30 composed of a cylinder 33, a piston 31 slidably disposed in the cylinder 33, and a piston rod 31a having one end connected to the piston 31 and an opposite end to the release lever 2a of the clutch 2. The cylinder 33 has a fluid chamber 33a communicating with the pump P through an on-off valve $V_2$ and the on-off valve $V_1$, and also with the tank T through an on-off valve $V_3$ and an on-off valve $V_4$ which is pulse-controlled. The cylinder 33 has another fluid chamber 33b communicating with the tank T at all times. The clutch stroke sensor 3a detects an operated position of the piston 31 of the clutch actuator 3 to thereby issue a signal indicative of the corresponding extent to which the clutch 2 is engaged.

When the on-off valve $V_2$ is opened by a drive signal $CDV_1$ from the electronic control system 15, hydraulic pressure is supplied by the pump P to the fluid chamber 33a to displace the piston 31 to the right (in FIG. 2), thereby disconnecting the clutch 2. When the on-off valves $V_3$, $V_4$ are opened by drive singals $CDV_2$, $CDV_3$, respectively, from the electronic control system 15, the hydraulic pressure is released from the fluid chamber 33a to displace the piston 31 to the left thus connecting the clutch 2. At this time, the on-off valve $V_4$ is pulse-driven by the drive signal $CDV_3$ to connect the clutch 2 gradually.

The gear changing actuator assembly 5 comprises a select actuator 50 and a shift actuator 55, which can selectively be stopped in three positions. The select actuator 50 is composed of a stepped cylinder 53, a first piston 51 slidably disposed in the stepped cylinder 53, and a second tubular piston 52 slidably disposed in the stepped cylinder 53 and fitted over the first piston 51. Likewise, the shift actuator 55 is composed of a stepped cylinder 58, a first piston 56 slidably disposed in the stepped cylinder 58, and a second tubular piston 57 slidably disposed in the stepped cylinder 58 and fitted over the first piston 56. The first pistons 51, 56 of the select and shift actuatqrs 50, 51 have piston rods 51a, 56a held in engagement with internal levers (not shown) in the gear transmission 6. The stepped cylinder 53 has fluid chambers 53a, 53b on each side of the pistons 51, 52, respectively, and the stepped cylinder 58 has fluid chambers 58a, 58b on each side of the pistons 56, 57, respectively. When hydraulic pressure is supplied to the fluid chambers 53a, 53b, 58a, 58b, the actuators 50, 55 are in their neutral position as illustrated in FIG. 2. When a hydraulic pressure acts in the fluid chambers 53a, 58a, the first pistons 51, 56 and the second pistons 52, 57 are moved to the right (in FIG. 2). When a hydraulic pressure acts in the fluid chambers 53b, 58b, only the first pistons 51, 56 are moved to the left.

The fluid chambers 53a, 53b in the select actuator 50 are held in communication through directional control valves $V_5$, $V_6$ respectively with the pump P (via the on-off valve $V_1$) and the tank T. The fluid chambers 58b, 58b in the shift actuator 55 are held in communication through directional control valves $V_7$, $V_8$ respectively with the pump P (via the on-off valve $V_1$) and the tank T.

In the illustrated condition, the gear transmission 6 is in a neutral position. When the fluid chamber 58a is connected to pump P via the directional control valve $V_7$ in accordance with a drive signal $ADV_4$ from the electronic control system 15 and the fluid chamber 58b is connected to tank T via the directional control valve $V_8$ in accordance with a drive signal $ADV_3$, the piston rod 56a is moved to the right to enable the gear transmission 6 to select a 2nd, 4th or reverse gear position. When a gear changing signal is generated indicating a gear shift from, for example, the 4th gear position to a 5th gear position, the electronic control system 15 applies the drive signals $ADV_3$, $ADV_4$ to connect fluid chambers 58a and 58b with pump P via the directional control valves $V_8$, $R_7$ so that the shift actuator 55 is returned to the neutral position as shown. Then, the electronic control system 15 issues a drive signal $ADV_1$ to connect fluid chamber 53b with the pump P via the directional control valve $V_6$ and a drive signal $ADV_2$ to connect fluid chamber 53a with the tank T via the directional control valve $V_5$, thereby moving the piston rod 51a to the left, to shift the select actuator 50 to a 5th-reverse select position. The electronic control system 15 thereafter applies a drive signal $ADV_3$ to connect fluid chamber 58b to pump P via the directional control valve $V_8$ and a drive signal $ADV_4$ to connect fluid chamber 58a with tank T via the directional control valve $V_7$, thus shifting the shift actuator 55 to a 5th gear position whereupon the gear transmission 6 selects a 5th gear. In a similar manner, the directional control valves $V_6$, $V_5$, $V_8$, $V_7$, are operated respectively by the drive signals $ADV_1$, $ADV_2$, $ADV_3$, $ADV_4$ from the electronic control system 15 to alternately actuate the select and shift actuators 50, 55 for enabling the gear transmission 6 to select any desired gear position.

Figure 6:
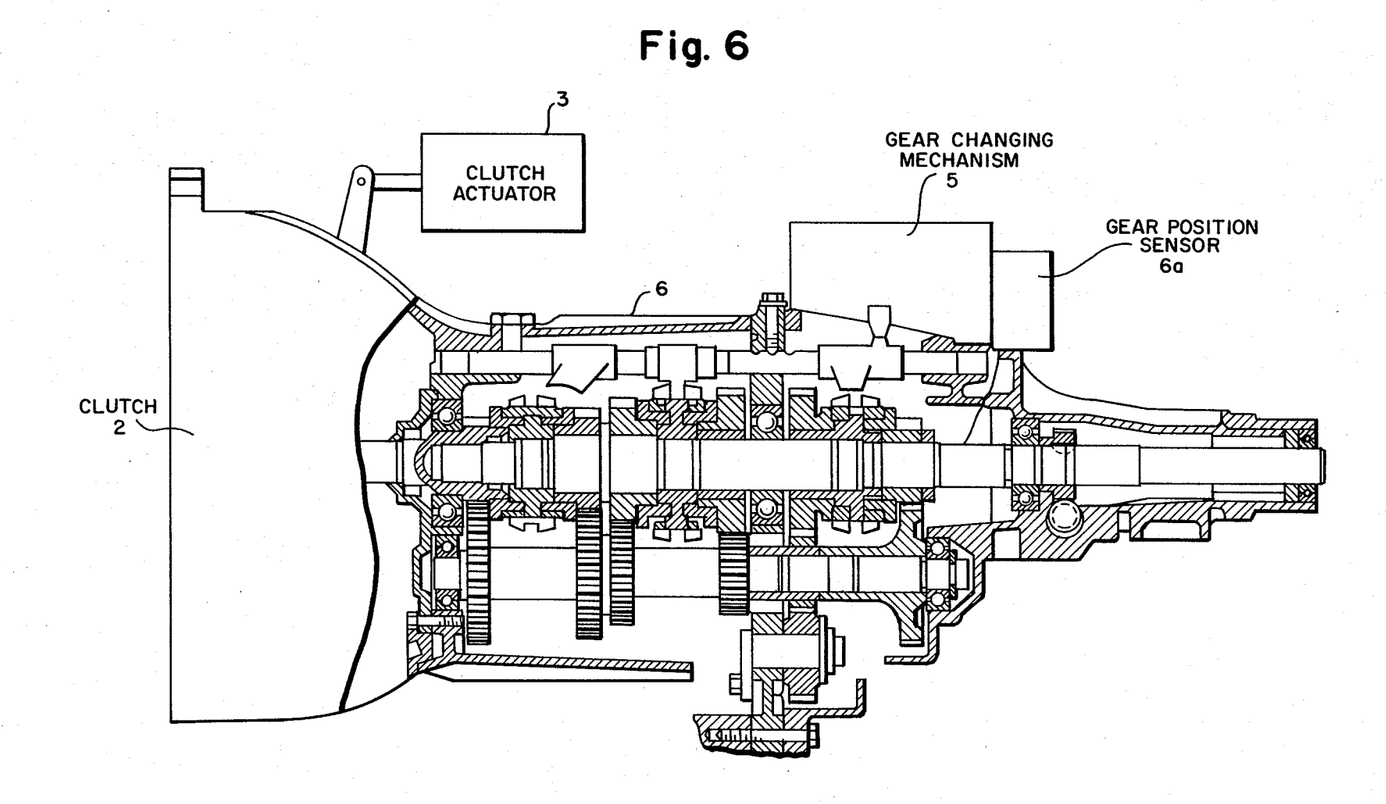
FIG. 6 is a diagram illustrating an arrangement of the automatic transmission, a clutch and the actuators for actuating the automatic transmission and the clutch.

FIG. 6 is a diagram illustrating an arrangement of the gear transmission 6, the clutch 2, the clutch actuator 3, and the gear changing actuator assembly 5. The gear transmission employed by the present invention is a well-known synchronous type gear transmission having gears on parallel shafts and the clutch is a well-known clutch, for example, a single dry disk clutch. Thus, a detailed description thereof is omitted.

Operation of the arrangement illustrated in FIG. 1 will now be described.

(1) When the select lever 7 is shifted to the "D" range to enable the select position sensor 7a to issue a "D" range selection signal SP to the input port 15d of the electronic control system 15, the processor 15a reads the "D" range selection signal SP through the BUS 15f and stores the selection signal in the RAM 15e. Then, the processor 15a issues the drive signal ADV through the output port 15c to drive the gear changing actuator assembly 5 to shift the gear transmission 6 into the 1st gear position.

(2) The processor 15a receives a selected-gear signal GP from the gear position sensor 6a through the input port 15d to detect that the gear transmission 6 is now in the 1st gear position, and then stores the selected-gear signal GP.

Figure 4:
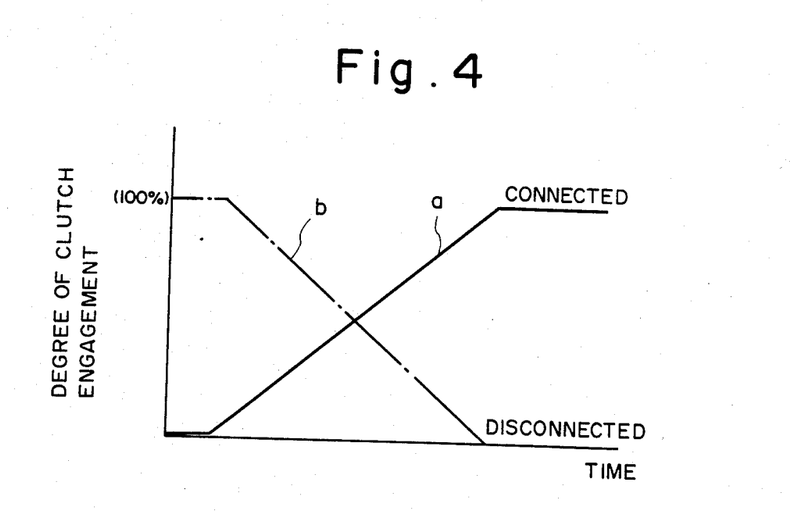
FIG. 4 is a diagram showing operation of a clutch in the automatic transmission of FIG. 1.

(3) The processor 15a issues a clutch drive signal CDV through the output port 15c to the clutch actuator 3 which gradually moves the piston rod 31a to the left so that the release lever 2a is turned counterclockwise (FIG. 1) about a pivot shaft 21. The clutch 2 is now actuated progressively from a disconnected position to a connected position as indicated by the curve a in FIG. 4, whereupon the car starts moving forward.

(4) Subsequently, the processor 15a determines an optimum gear position (or ratio) dependent on the car speed V, the extent of depression of the accelerator pedal 8, indicated by single AP and the range selection signal SP from the select lever 7.

Figure 5:
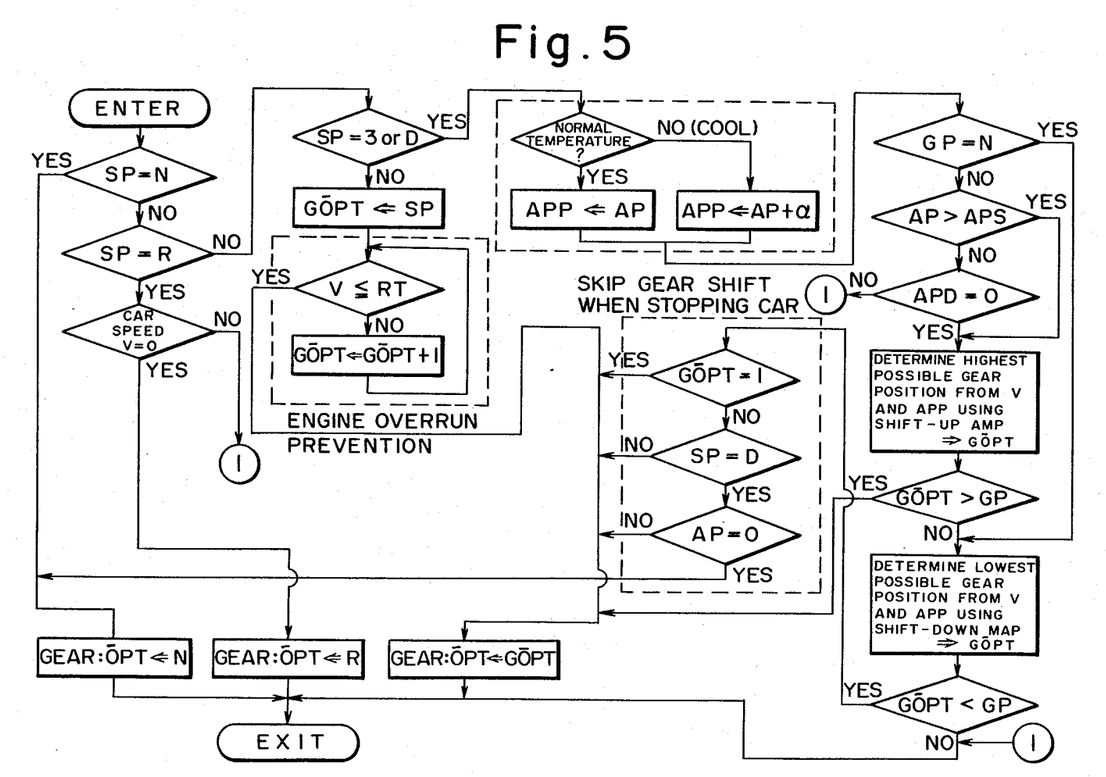
FIG. 5 is a flowchart of progressive steps of operation of the automatic transmission control system.

The gear changing operation will be described in greater detail with reference to the flowchart of FIG. 5.

(a) The processor 15a receives the range selection signal SP indicative of the selected range of the selector lever 7 through the input port 15d and discriminates the received range selection signal SP. If the range selection signal SP indicates the neutral (N) range, then a gear command $\overline{GEAR:OPT}$ is set to "N".

(b) If the range selection signal SP is indicative of the reverse (R) range, then the processor 15a discriminates the car speed V. Since the car speed V is periodically computed by the processor 15a in response to detected pulses WP periodically received from the car speed sensor 12a through the input port 15d and is stored in the RAM 15e, the processor 15a reads the stored car speed V and determines if it is zero or not. If the car speed V is zero, indicating that the car is stopped, the processor 15a sets the gear command $\overline{GEAR:OPT}$ to "R". If the car speed V is not zero, then the car is moving and the processor 15a effects no processing, whereupon control leaves the program shown in FIG. 5.

(c) If the range selection signal SP is indicative of neither the "N" and "R" ranges nor the "3" and "D" ranges, then the range selection signal SP indicates the "1" or "2" range, and the processor 15a stores this range selection signal SP in the RAM 15e as a gear selection signal $\overline{GOPT}$. Then, the processor 15a compares a shift-down limit car speed signal RT for the gear position with the car speed V stored in the RAM 15e based on a table stored in the ROM 15b. If $RT < V$, that is, if the car speed V is higher than the shift-down limit car speed RT, then the engine speed would overrun, and hence the processor 15a adds "1" to the gear selection signal $\overline{GOPT}$ to provide a new gear selection signal $\overline{GOPT}$ for designate a gear position one higher. If $RT \geq V$, then the processor 15a uses the gear selection signal $\overline{GOPT}$ as the gear command $\overline{GEAR:OPT}$.

(d) If the range selection signal SP is indicative of the "3" or "D" range, then the processor 15a effects signal compensation for a cool engine condition.

More specifically, the processor 15a detects whether the engine is at normal temperature or not (cool) based on a water temperature signal from a water temperature sensor (not shown) which detects the temperature of engine cooling water. If the engine is cool, then the processor 15a adds a predetermined value $\alpha$ to the detected extent of depression AP of the accelerator pedal 8 and stores the sum as an accelerator pedal depression signal APP in the RAM 15e. If the engine is at normal temperature, then the processor 15a stores the detected extent of depression AP of the accelerator pedal 8 directly as the accelerator pedal depression signal APP in the RAM 15e.

(e) Then, the processor 15a detects the current gear position GP of the gear transmission 6 through the input port 15d and determines whether the detected gear position GP is the neutral position or not. If the gear position GP is the neutral position, then the gear transmission is being controlled on deceleration according to the present invention, and the program goes to another step (later described).

(f) If the gear position GP is not the neutral position, then the processor 15a determines whether the extent of depression AP of the accelerator pedal 8 is greater than a set (or predetermined) value APS or not. If AP is smaller than APS, then the processor 15a finds the difference between the previous extent of depression AP (t−1) of the accelerator pedal 8 and the current extent of depression AP (t) of the accelerator pedal 8. If the difference APD is not zero, then the processor 15a regards the output of the sensor 8a as unstable and effects no processing, whereupon the program of FIG. 5 is ended.

If the difference APD is zero (the output of the accelerator pedal sensor 8a is stable) and AP>APS, then the program goes to a next shift map search step.

Figure 3:
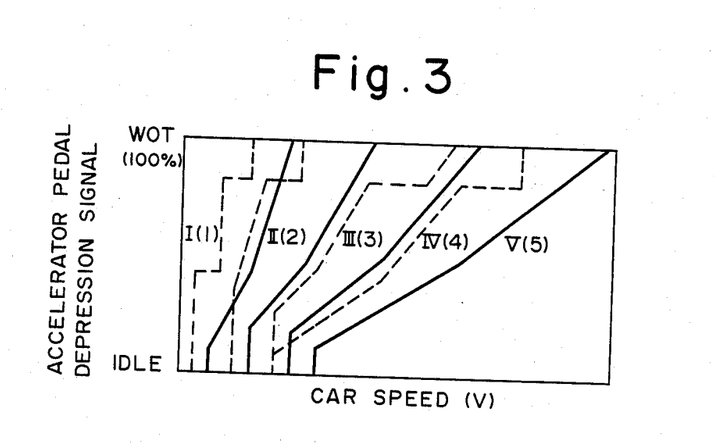
FIG. 3 is a diagram illustrating a gear shift map for the automatic transmission shown in FIG. 1.

(g) The processor 15a searches a shift map for an optimum gear position based on the car speed V and the accelerator depression signal APP stored in the RAM 15e.

The shift map is stored as a table SM in the ROM 15b and is dependent on the car speed V and the accelerator pedal depression signal APP. The shift map has areas representative of gear positions I, II, III, VI, V which are bounded by solid lines at the time the gears are shifted up and by dotted lines at the time the gears are shifted down. Therefore, the shift map is a mixture of a shift-up map and a shift-down map.

The processor 15a determines a highest possible gear position from the car speed V and the accelerator pedal depression signal APP using the shift-down map, and stores the determined gear position as the gear selection signal $\overline{GOPT}$ in the RAM 15e.

(h) Then, the processor 15a compares the gear position GP detected through the input port 15d and stored in the RAM 15e with the gear selection signal $\overline{GOPT}$. If $\overline{GOPT}$>GP, or the gears are to be shifted up, then the processor 15a employs the gear selection signal $\overline{GOPT}$ as the gear command GEAR:$\overline{OPT}$.

(i) IF GP≧$\overline{GOPT}$, then the gears cannot be shifted up, and the processor 15a determines a lowest possible gear position from the car speed V and the accelerator pedal depression signal APP using the shift-down map, and stores the determined gear position as the gear selection signal $\overline{GOPT}$ in the RAM 15e.

(j) The processor 15a compares the gear position GP stored in the RAM 15e with the gear selection signal $\overline{GOPT}$. If GP≦$\overline{GOPT}$, then the gears cannot be shifted down and the processor 15a effects no further processing, whereupon the program goes to an end.

(k) If GP>$\overline{GOPT}$, then the gears can be shifted down and the processor 15a effects a skip shift process.

More specifically, the processor 15a detects whether the gear selection signal $\overline{GOPT}$ is indicative of the 1st gear position. If the gear selection signal $\overline{GOPT}$ indicates the 1st gear position, then the processor 15a regards this gear selection signal as the gear command GEAR:$\overline{OPT}$. If not the 1st gear position, then the processor 15a detects whether the selected range is the "D" range or not. If not the "D" range (if the "3" range), the processor 15a employs the gear selection signal $\overline{GOPT}$ as the gear command GEAR:$\overline{OPT}$. If the selected range is the "D" range, then the processor 15a detects whether the extent of depression AP of the accelerator pedal 8 is zero or not. If not zero, then the procssor 15a regards the gear selection signal $\overline{GOPT}$ as the gear command GEAR:$\overline{OPT}$.

If the extent of depression AP of the accelerator pedal 8 is zero, or when the accelerator pedal 8 is released, then the processor 15a disregards the gear selection signal $\overline{GOPT}$ and sets the gear command GEAR:$\overline{OPT}$ to neutral (N).

Therefore, while the gears are shifted down, the gear transmission is in the "D" range except when the gears are shifted down to the 1st gear position. When the accelerator pedal is released, the gear transmission is in the neutral position.

(1) When the gear command GEAR:$\overline{OPT}$ is thus determined, the processor 15a issues the clutch drive signal CDV through the output port 15c to the clutch actuator 3 to supply a hydraulic pressure to the fluid chamber 33a in the cylinder 33. The piston rod 31a is then moved to the right to turn the release lever 2a clockwise (FIG. 1) about the pivot shaft 2, thereby gradually disconnecting the clutch 2 as indicated by the curve b in FIG. 4. Then, the processor 15a issues the drive signal ADV through the BUS 15f and the output port 15c to the gear changing actuator assembly 5 for selecting a gear corresponding to the determined gear command. The gear changing actuator assembly 5 is now connected to the hydraulic mechanism 4, so that the select and shift actuators 50, 55 are hydraulically controlled to operate the gear transmission 6 to put the desired gears into synchronous mesh with each other.

(m) Upon completion of the gear changing operation, the processor 15a delivers the clutch drive signal CDV to the clutch actuator 3 to engage the clutch 2.

Where the gear command GEAR:OPT indicates the neutral gear position through the above skip gear shift process, the clutch 2 remains disengaged.

The foregoing procedure is periodically effected to perform the automatic gear changing and skip gear shift operation.

Briefly summarized, while the car speed is being lowered with the accelerator pedal released at the time the selector lever 7 is in the D range, the gear transmission 6 is kept in the neutral position until the accelerator pedal is depressed except when the gears are shifted to the 1st gear position. Therefore, unnecessary gear changing operation of the gear changing actuator assembly is avoided. As an example, while the car speed is lowered from 45 km/h with the accelerator pedal released and the D range selected, the gear transmission is in the neutral position rather than being shited down to the 4th gear position, and the gears are then shifted to the 1st gear position after a 1st-gear shift-down is detected at the car speed of 5 km/h. If, for example, the accelerator pedal is depressed to 50% of its stroke while the gear transmission is in the neutral position, the gears are then shifted down to the 3rd gear position.

Although a certain preferred embodiment has been shown and described, it should be understood that many changes and modifications may be made therein without departing from the scope of the appended claims.

what we claim is:

1. A method of controlling the gear changing operation in an automatic transmission having a gear transmission, a gear changing actuator assembly for changing gears in the gear transmission, a vehicle speed sensor for detecting a vehicle speed, an accelerator pedal, an accelerator pedal sensor for detecting the extent of depression of the accelerator pedal, and an electronic control system responsive to signals from the vehicle speed sensor and the accelerator pedal sensor for determining an optimum gear position and controlling the gear changing actuator assembly to operate the gear transmission to select the optimum gear position, comprising the steps of:

(a) detecting an extent of depression of the accelerator pedal from the accelerator pedal sensor, and a vehicle speed from the vehicle speed sensor;

(b) determining an optimum gear position based on the extent of depression of the accelerator pedal and the vehicle speed; and (c) controlling the gear changing actuator assembly to operate the gear transmission to select a neutral position, for interrupting gear changing operation until the accelerator pedal is depressed, when said determined optimum gear position is lower than a currently selected gear position and when the extent of depression of the accelerator pedal is zero.

2. A method of controlling the gear changing operation in an automatic transmission having a gear transmission, a gear changing actuator assembly for changing gears in the gear transmission, vehicle speed sensor for detecting a vehicle speed, an accelerator pedal, an accelerator pedal sensor for detecting the extent of depression of the accelerator pedal, and an electronic control system responsive to detected signals from the vehicle speed sensor and the accelerator pedal sensor for determining an optimum gear position and controlling the gear changing actuator assembly to operate the gear transmission to select the optimum gear position, comprising the steps of:

(a) detecting an extent of depression of the accelerator pedal from the accelerator pedal sensor, and a vehicle speed from the vehicle speed sensor;

(b) determining an optimum gear position based on the extent of depression of the accelerator pedal and the car speed; and (c) controlling the gear changing actuator assembly to operate the gear transmission to select a 1st gear position if the optimum gear position determined in step (b) is a 1st gear position, the extent of depression of the accelerator pedal is zero and said optimum gear position determined in step (b) is lower than the currently selected gear position, and controlling the gear transmission to select a neutral position when the optimum gear position determined in step (b) is not a 1st gear position, the extent of depression of the accelerator pedal is zero and said optimum gear position determined in step (b) is lower than the currently selected gear position and maintaining the neutral position until the accelerator pedal is depressed.

3. A method according to claim 1, wherein said electronic control system comprises a microcomputer.

4. A method according to claim 1, wherein said gear transmission comprises gears on parallel shafts.

5. A method according to claim 1, wherein said gear transmission comprises gears on parallel shafts and a synchromesh system.

6. A method according to claim 2, wherein said electronic control system comprises a microcomputer.

7. A method according to claim 2, wherein said gear transmission comprises gears on parallel shafts.

8. A method according to claim 2, wherein said gear transmission comprises gears on parallel shafts and a synchromesh system.

9. A method of controlling a gear changing operation of an automatic transmission in a vehicle, comprising the steps of:

(a) detecting an extent of depression of an accelerator pedal;

(b) detecting a vehicle speed;

(c) determining an optimum gear ratio based on the extent of depression of the accelerator pedal and the vehicle speed; and (d) detecting a currently selected gear position;

(e) electing neutral if the optimum gear ratio is less than the selected gear ratio and the extent of depression of the accelerator pedal is less than a first predetermined value to interrupt the gear changing operation until the extent of depression of the accelerator pedal is greater than a second predetermined value.

10. A method of controlling a gear changing operation of an automatic transmission in a vehicle, comprising the steps of:

(a) detecting an extent of depression of an accelerator pedal;

(b) detecting a vehicle speed;

(c) determining an optimum gear ratio based on the extent of depression of the accelerator pedal and the vehicle speed; and (d) detecting a currently selected gear position;

(e) selecting a first gear ratio if the optimum gear ratio determined in step (c) is the first gear ratio, the extent of depression of the accelerator pedal is less than a first predetermined value and the optimum gear ratio determined in step (c) is lower than the currently selected gear ratio detected in step (d), and selecting and maintaining neutral, if the optimum gear ratio determined in step (c) is a ratio higher than the first gear ratio, the extent of depression of the accelerator pedal is less than the first predetermined value and the optimum gear ratio determined in step (c) is lower than the currently selected gear ratio determined in step (d), until the extent of depression of the accelerator exceeds a second predetermined value.

* * * * *